(12) United States Patent
Kis et al.

(10) Patent No.: US 11,679,665 B2
(45) Date of Patent: Jun. 20, 2023

(54) HEAT EXCHANGER MODULE

(71) Applicant: Modine Manufacturing Company, Racine, WI (US)

(72) Inventors: Michael Kis, Sturtevant, WI (US); Casey McIntosh, Racine, WI (US)

(73) Assignee: MODINE MANUFACTURING COMPANY, Racine, WI (US)

( * ) Notice: Subject to any disclaimer, the term of this patent is extended or adjusted under 35 U.S.C. 154(b) by 0 days.

(21) Appl. No.: 17/541,816

(22) Filed: Dec. 3, 2021

(65) Prior Publication Data

US 2022/0176805 A1 Jun. 9, 2022

Related U.S. Application Data (60) Provisional application No. 63/121,224, filed on Dec. 3, 2020.

(51) Int. Cl.
*B60K 11/04* (2006.01)
*F04D 29/54* (2006.01)

(52) U.S. Cl.
CPC ............ *B60K 11/04* (2013.01); *F04D 29/541* (2013.01)

(58) Field of Classification Search
CPC ....... B60K 11/04; B60K 11/00; F04D 29/541; F01P 2003/187; F01P 11/10; F01P 5/06
See application file for complete search history.

(56) References Cited

U.S. PATENT DOCUMENTS

| 6,676,371 B1 * | 1/2004 | Brown ................... F04D 29/023 |
| | | 248/229.22 |
| 2002/0110462 A1 * | 8/2002 | Hunt ..................... F04D 29/582 |
| | | 417/366 |
| 2005/0042088 A1 * | 2/2005 | Horski .................. F04D 29/522 |
| | | 415/213.1 |
| 2007/0048138 A1 * | 3/2007 | Horski .................. F04D 29/526 |
| | | 416/179 |
| 2015/0167532 A1 | 6/2015 | Kim |
| 2016/0001629 A1 | 1/2016 | Rohr |
| 2017/0059257 A1 | 3/2017 | Wang |
| 2017/0166043 A1 | 6/2017 | Yun et al. |
| 2019/0085866 A1 | 3/2019 | Ota et al. |
| 2021/0003065 A1 * | 1/2021 | Cremering ................ F01P 3/18 |

FOREIGN PATENT DOCUMENTS

| EP | 0886048 A2 * | 12/1998 |
| KR | 2011136165 A * | 12/2011 |

OTHER PUBLICATIONS

International Search Report with Written Opinion issued for related Application No. PCT/US2021/061778 dated Feb. 23, 2022(14 Pages).

* cited by examiner

*Primary Examiner* — Hung Q Nguyen
(74) *Attorney, Agent, or Firm* — Michael Best & Friedrich LLP (57) ABSTRACT

A heat exchanger module mountable to a vehicle frame by first and second lateral sides of the heat exchanger module. The heat exchanger module includes a fan shroud. The fan shroud is a structural fan shroud. The fan shroud includes first and second frame brackets extending from the fan shroud, one on the first lateral side and one on the second lateral side. The fan shroud is attached to at least one of a first heat exchanger and a second heat exchanger by at least one fastener that extends through the fan shroud.

19 Claims, 10 Drawing Sheets

HEAT EXCHANGER MODULE

CROSS-REFERENCE TO RELATED APPLICATIONS

This application claims priority to U.S. Provisional Patent Application No. 63/121,224, filed Dec. 3, 2020. The disclosure of the above application is incorporated herein by reference in its entirety.

BACKGROUND

The invention relates to vehicle powertrain heat exchanger modules and vehicle heat exchange systems for regulating the temperature of vehicle components depending on vehicle conditions and the temperature of heat exchanger fluids, and especially to the way that such heat exchanger modules are mounted to the vehicle. Heat exchanger modules have been mounted to vehicles by module frames which attach to the vehicle at the vehicle frame or other location and to which the heat exchangers are attached and supported. Module frames have provided adequate support for the heat exchangers in such a configuration due to the structural strength and configuration of the module frames. Frameless designs for heat exchanger modules also exist, but require extra structural supports, like struts, or extra support via structure or configuration of tanks of the heat exchangers.

SUMMARY

According to an embodiment of the invention, a fan shroud for mounting a heat exchanger module to a vehicle frame includes: an air outlet at a first side of the fan shroud; an air inlet at a second side of the fan shroud that is spaced-apart in a depth direction from the first side; an air chamber extending between the air inlet and the air outlet; an air chamber wall at least partially defining the air chamber; a support wall extending in the depth direction and spaced-apart from the air chamber wall; a first frame bracket extending outwardly from the support wall; a second frame bracket extending outwardly from the support wall; and a plurality of inner walls that extend between the air chamber wall and the support wall.

According to an embodiment of the invention, a heat exchanger module includes a plurality of heat exchangers and a fan shroud. The plurality of heat exchangers are arranged consecutively in a depth direction of the heat exchanger module. The plurality of heat exchangers have a first, lateral side and a second lateral side. The plurality of heat exchangers further include: a first heat exchanger having a first core with a first core depth in the depth direction; and a second heat exchanger having a second core with a second core depth in the depth direction. The second heat exchanger includes a first mounting bracket on the first, lateral side and a second mounting bracket on the second, lateral side. The fan shroud is located at one end of the heat exchanger module in the depth direction. The fan shroud includes: an outer wall extending in the depth direction; an inner wall extending in the depth direction; a first frame bracket; and a second frame bracket. The wall outer defines at least a portion of a cavity that extends in the depth direction. The inner wall extends in the depth direction and also defines the cavity. The first frame bracket extends from the outer wall on the first, lateral side. The second frame bracket extends from the outer wall on the second, lateral side. The outer wall, the inner wall, and the cavity are positioned about an air chamber configured to receive a fan. The fan shroud is attached to each of the first heat exchanger and the second heat exchanger by a fastener that extends through the fan shroud. The heat exchanger module is configured to mount to a vehicle frame via the first frame bracket and the second frame bracket. The cavity is partitioned by a plurality of partition walls extending from the outer wall to the inner wall.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 9:
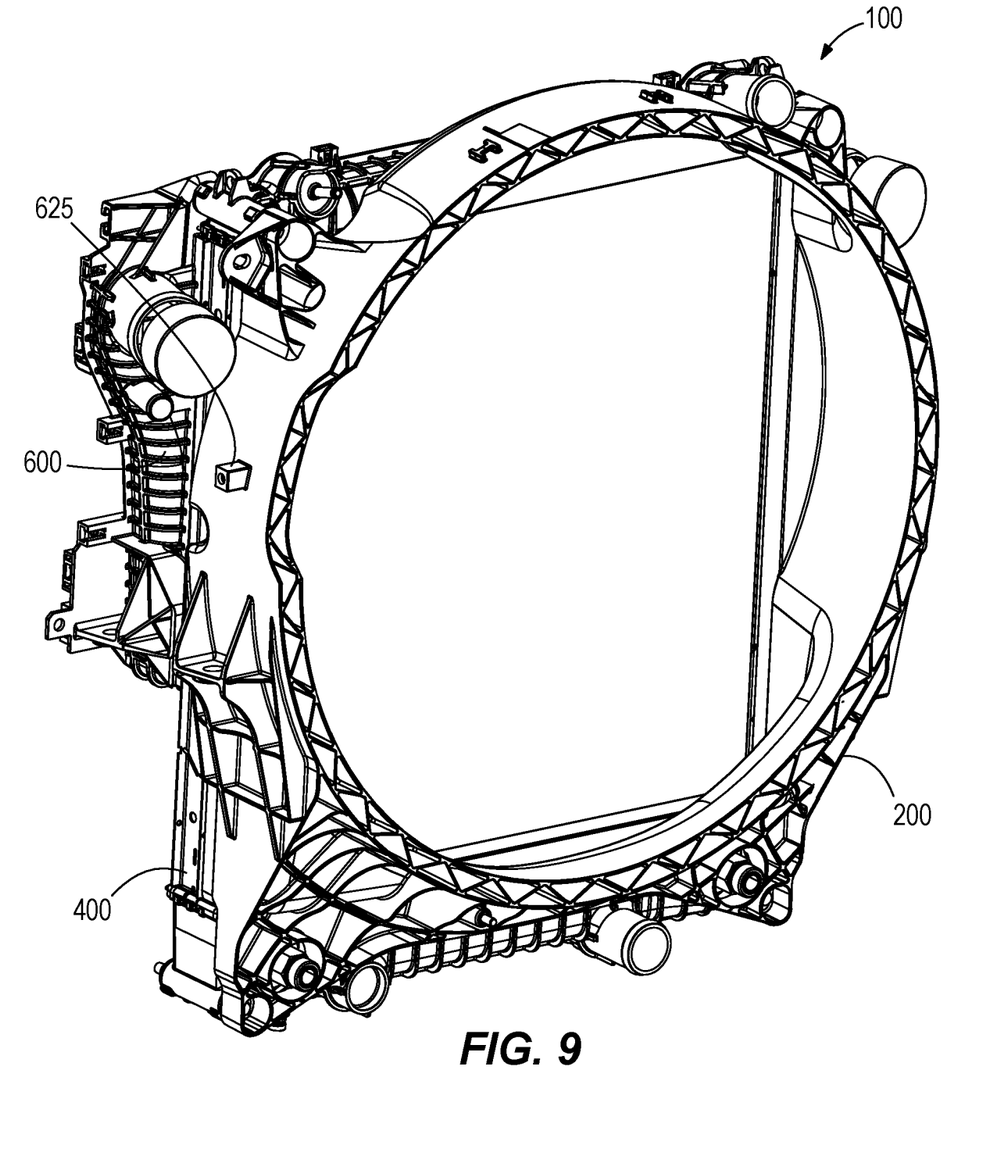
FIG. 9 is a front perspective view of a heat exchanger module of another embodiment.
Figure 10:
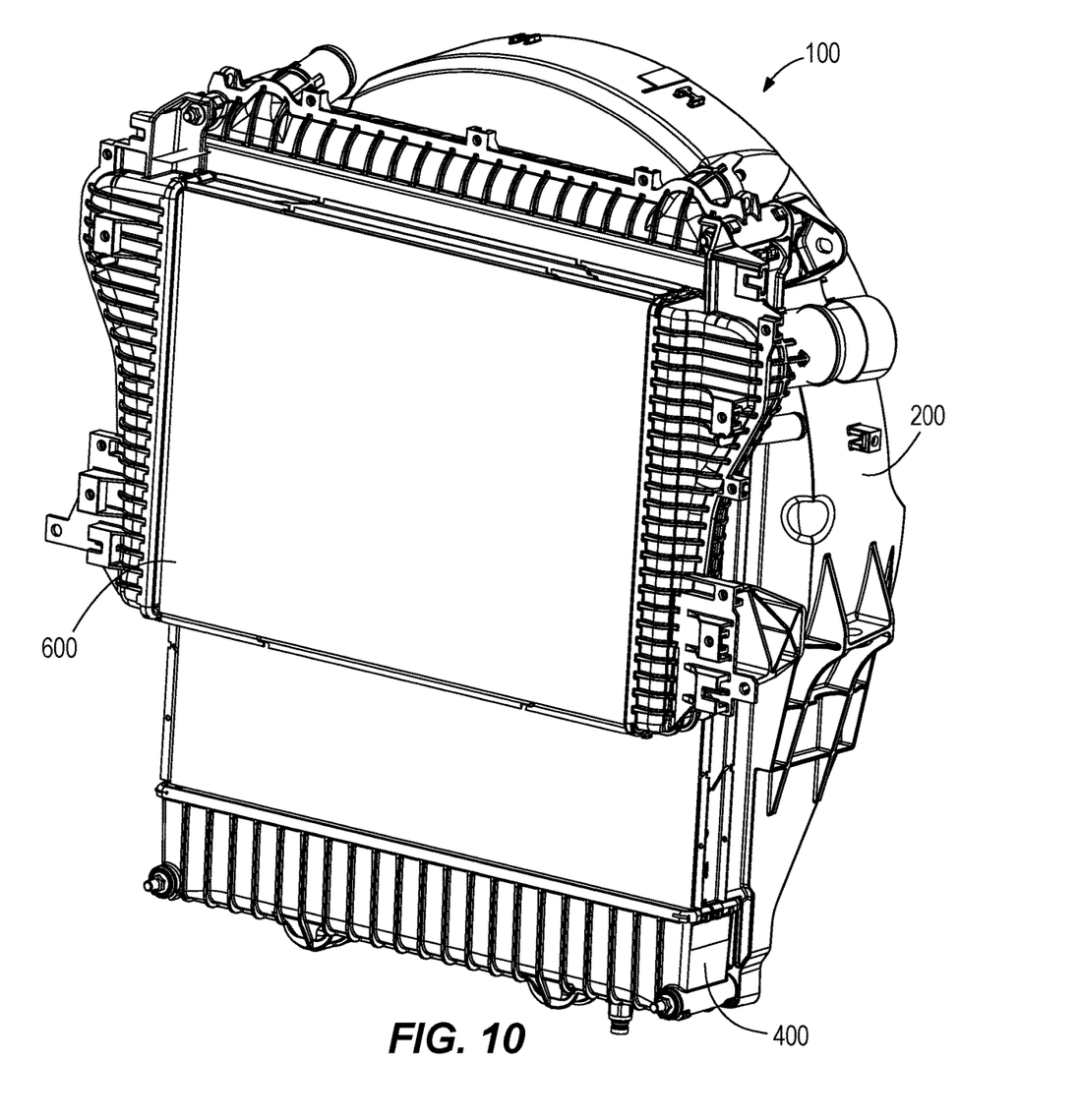
FIG. 10 is a rear perspective view of a heat exchanger module of another embodiment.
Figure 11:
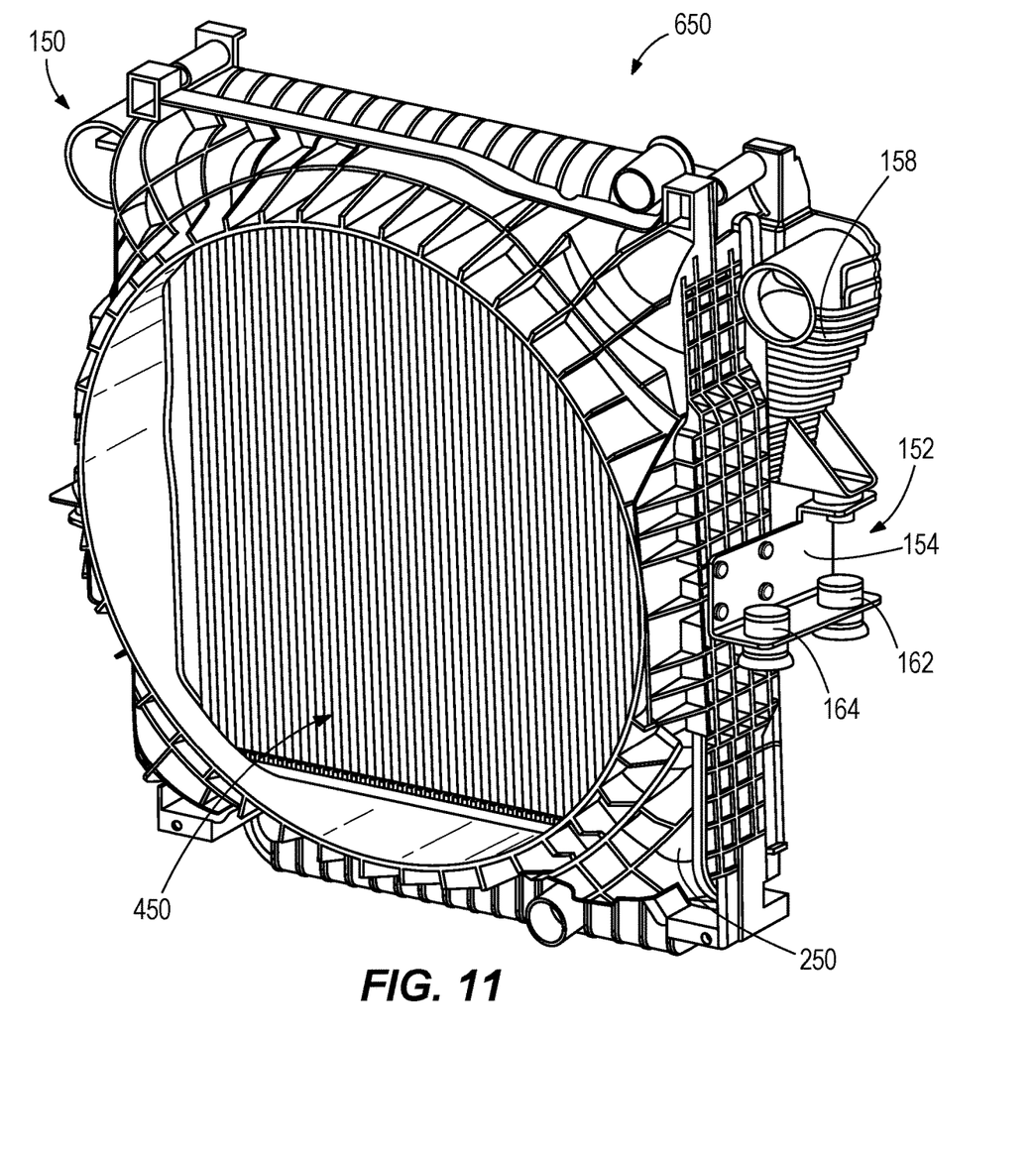
FIG. 11 is a front perspective view of a heat exchanger module, according to yet another embodiment.

A heat exchange module embodying the present invention is shown in FIGS. 1-8 and can provide a frameless structure for a plurality of heat exchangers and a fan shroud to be mounted to a vehicle frame. FIGS. 9-11 show different embodiments for a similar frameless structure.

Figure 1:
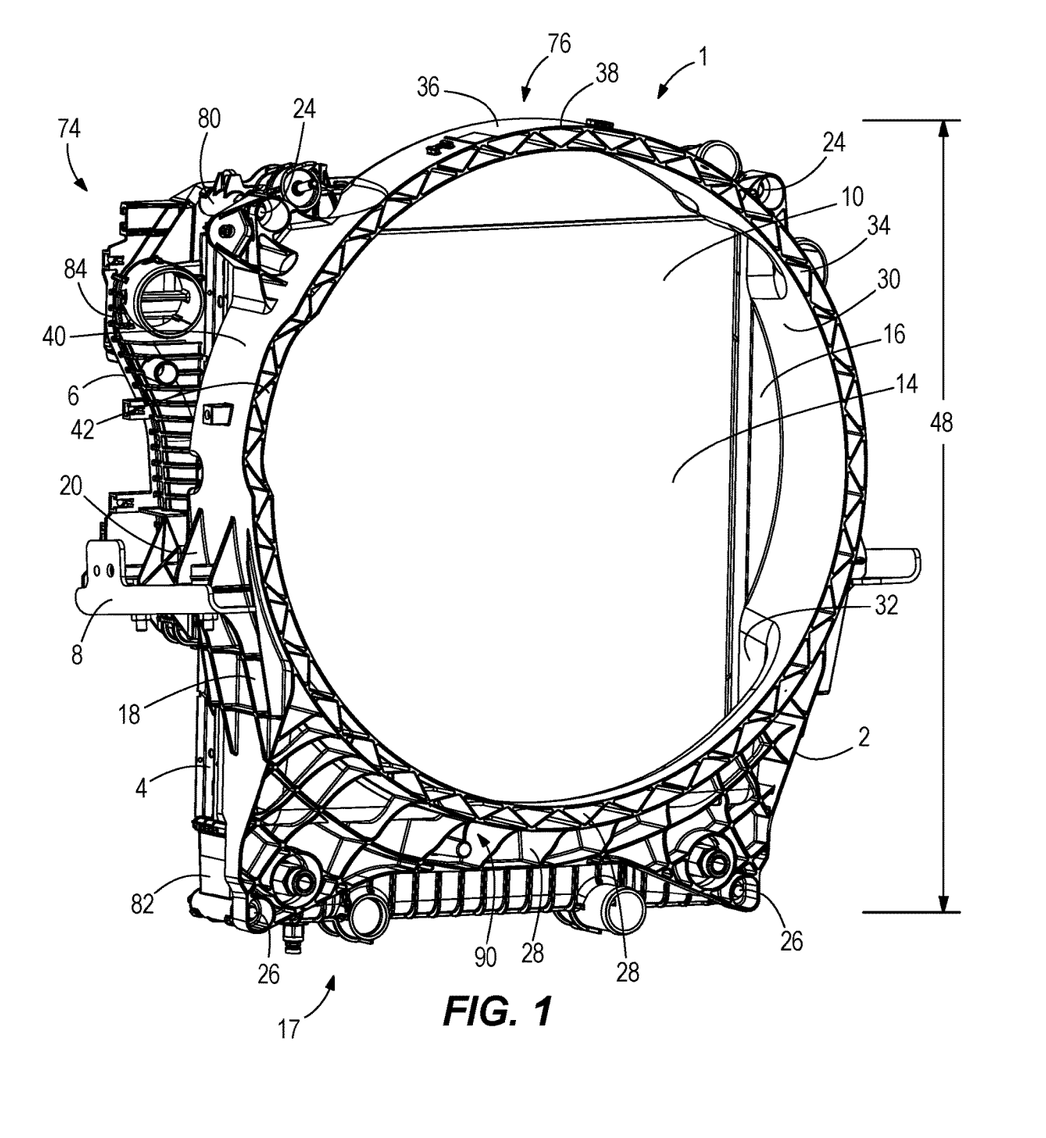
FIG. 1 is a front perspective view of a heat exchanger module of the current embodiment.
Figure 2:
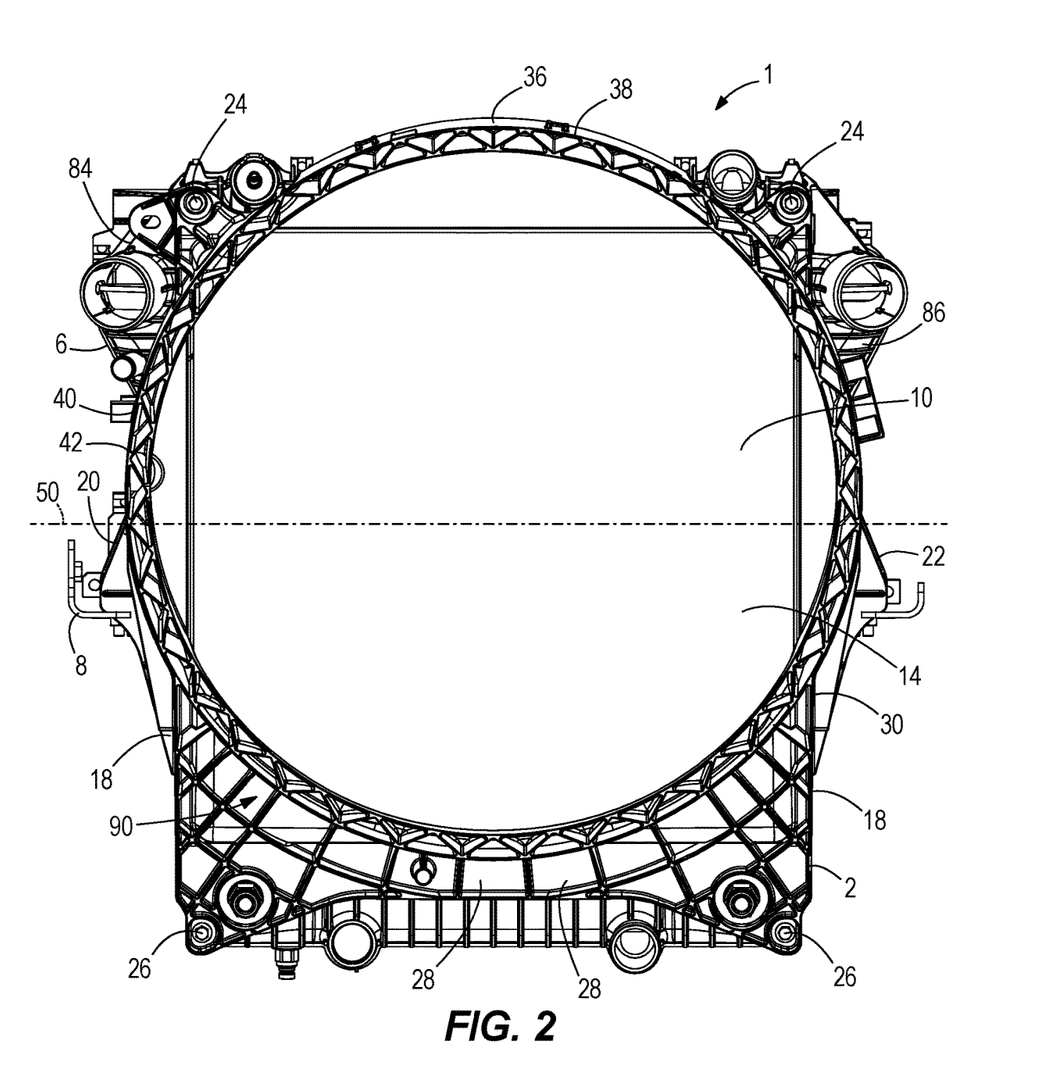
FIG. 2 is a front view of a heat exchanger module of the current embodiment.
Figure 3:
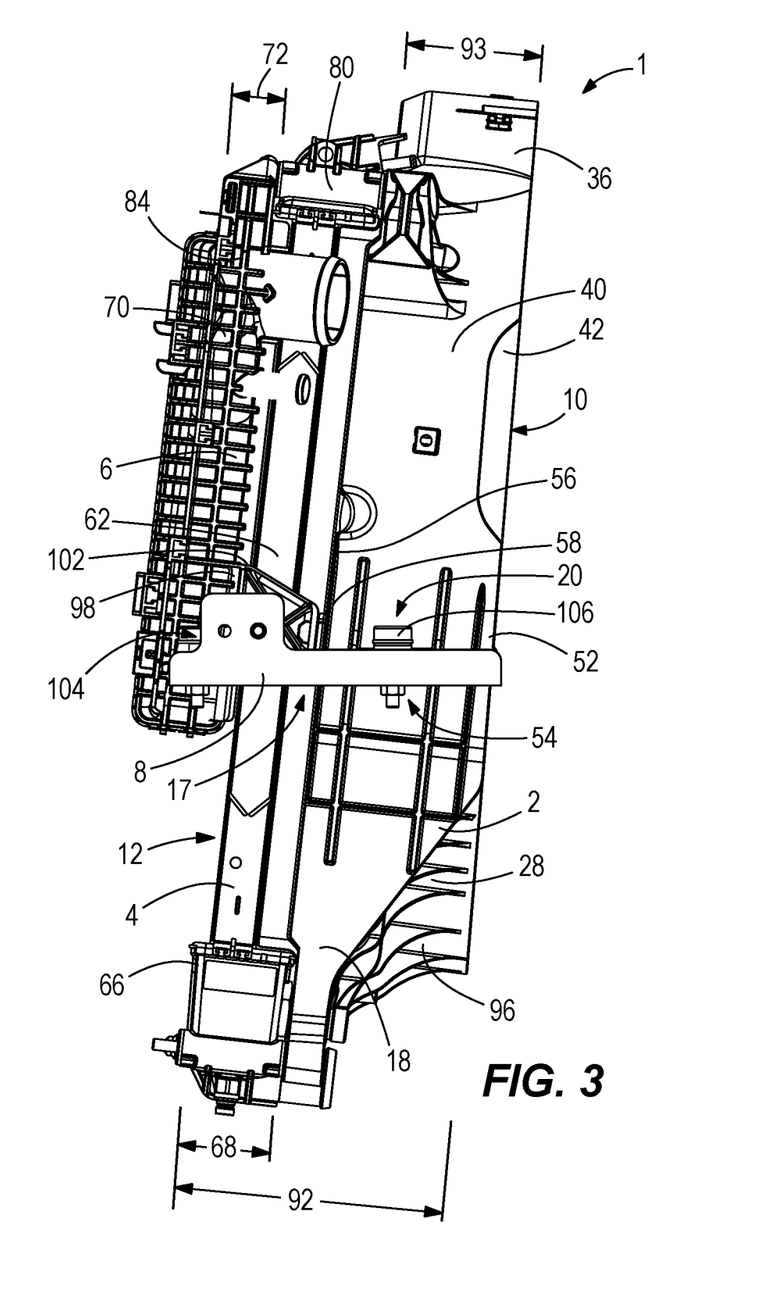
FIG. 3 is a side view of a heat exchanger module of the current embodiment.
Figure 4:
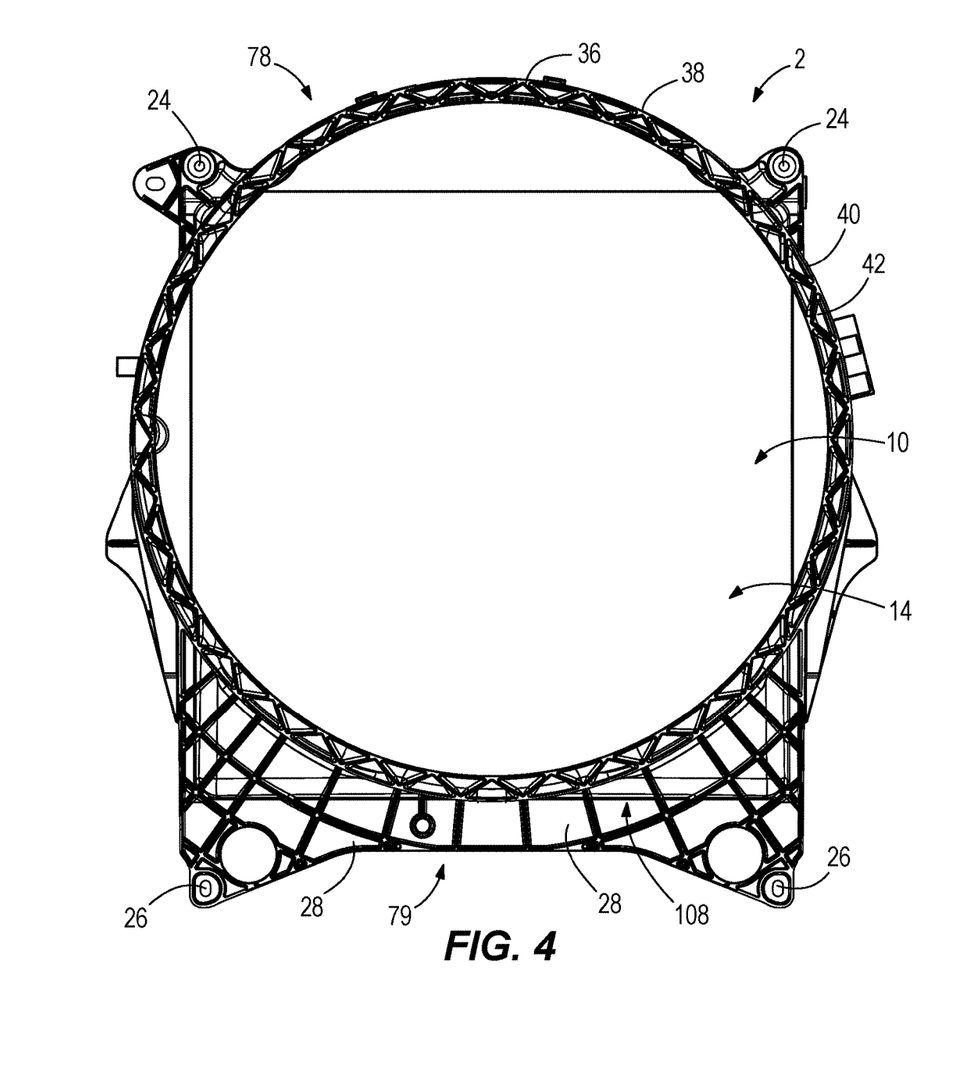
FIG. 4 is a front view of a fan shroud of the current embodiment.
Figure 5:
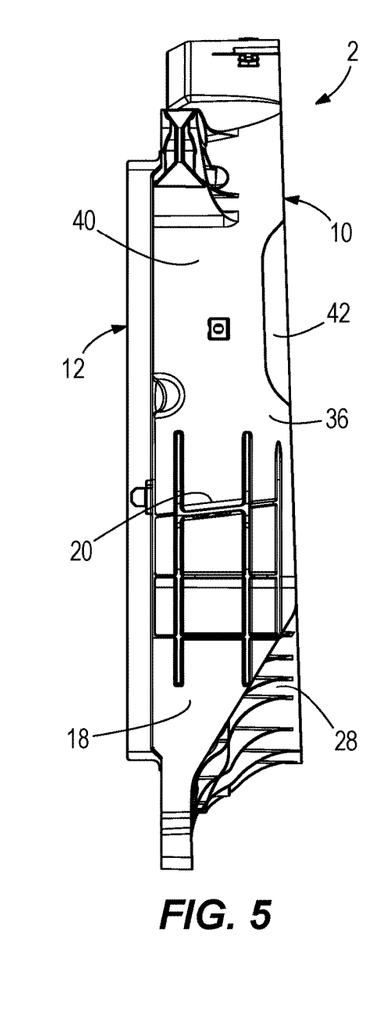
FIG. 5 is a side view of a fan shroud of the current embodiment.
Figure 6:
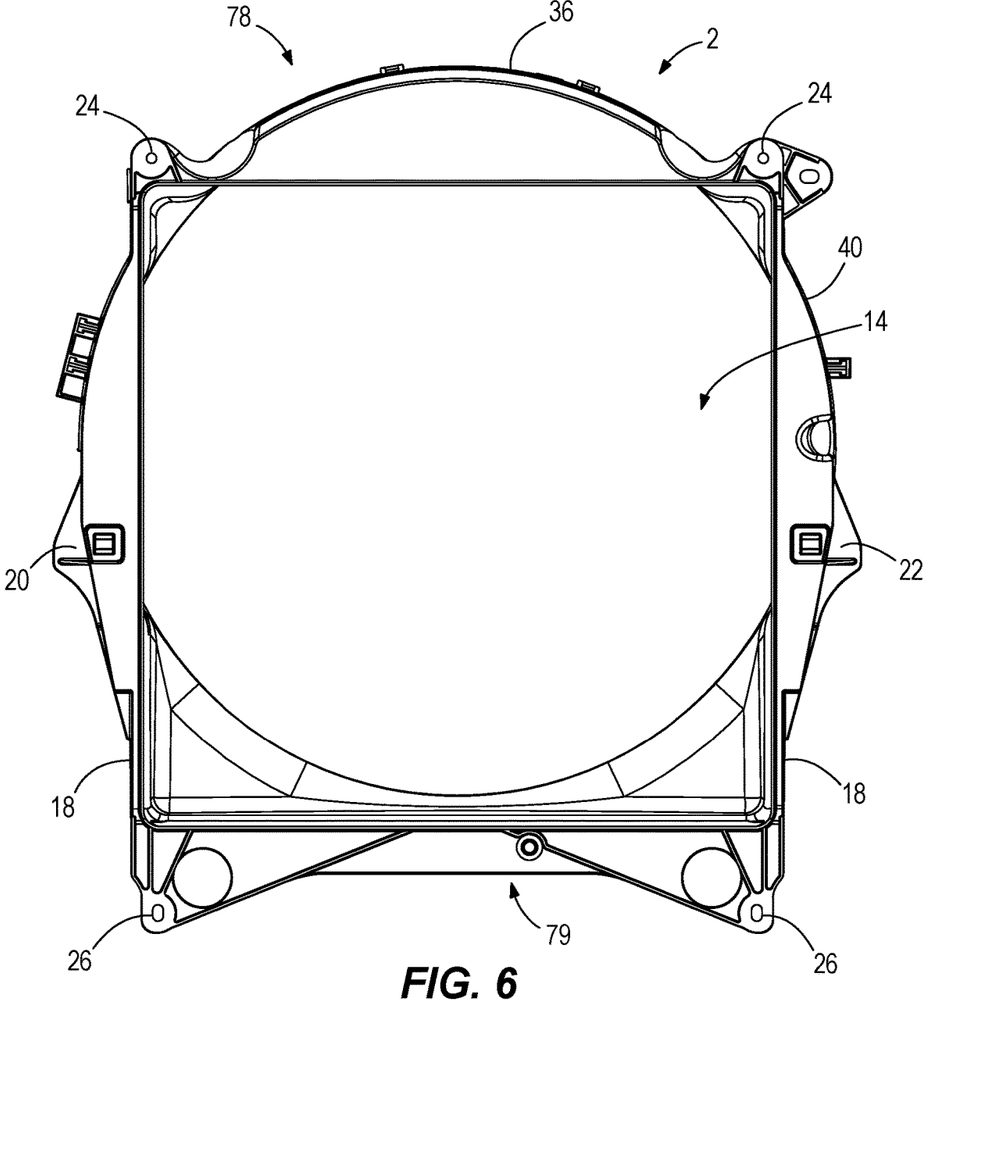
FIG. 6 is a rear view of a fan shroud of the current embodiment.
Figure 7:
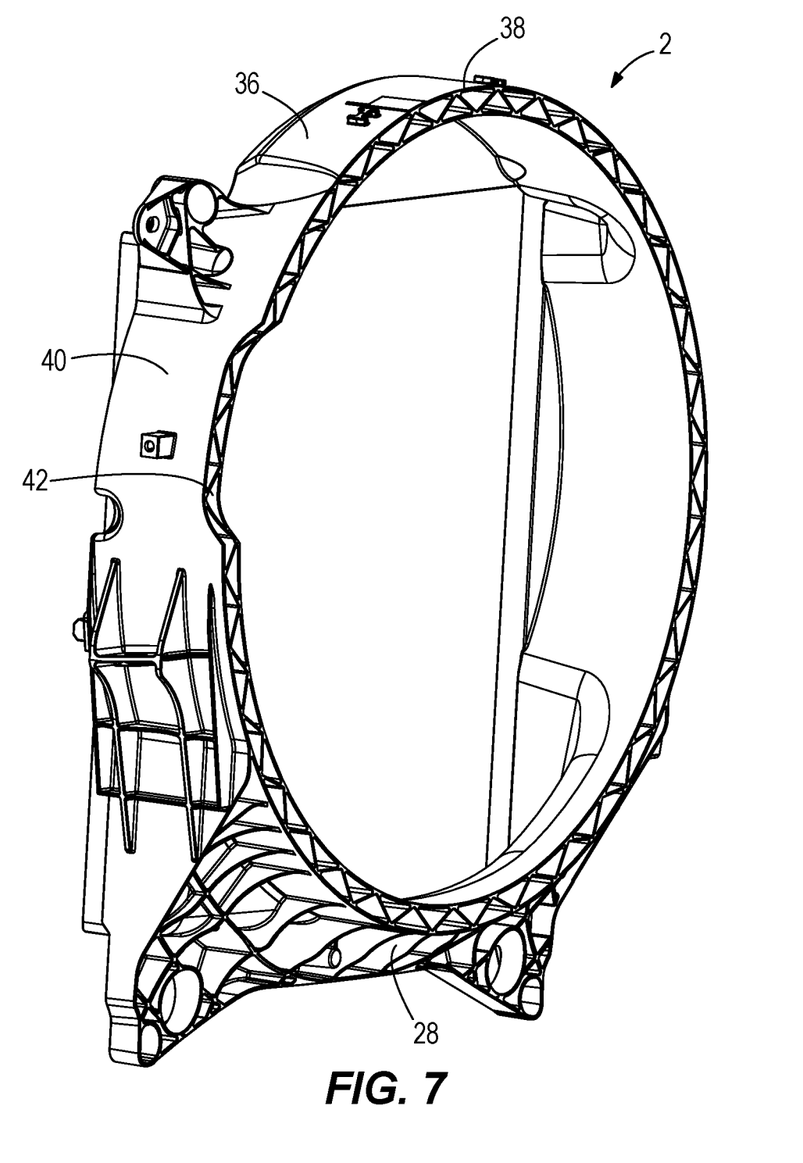
FIG. 7 is a front perspective view of a fan shroud of the current embodiment.
Figure 8:
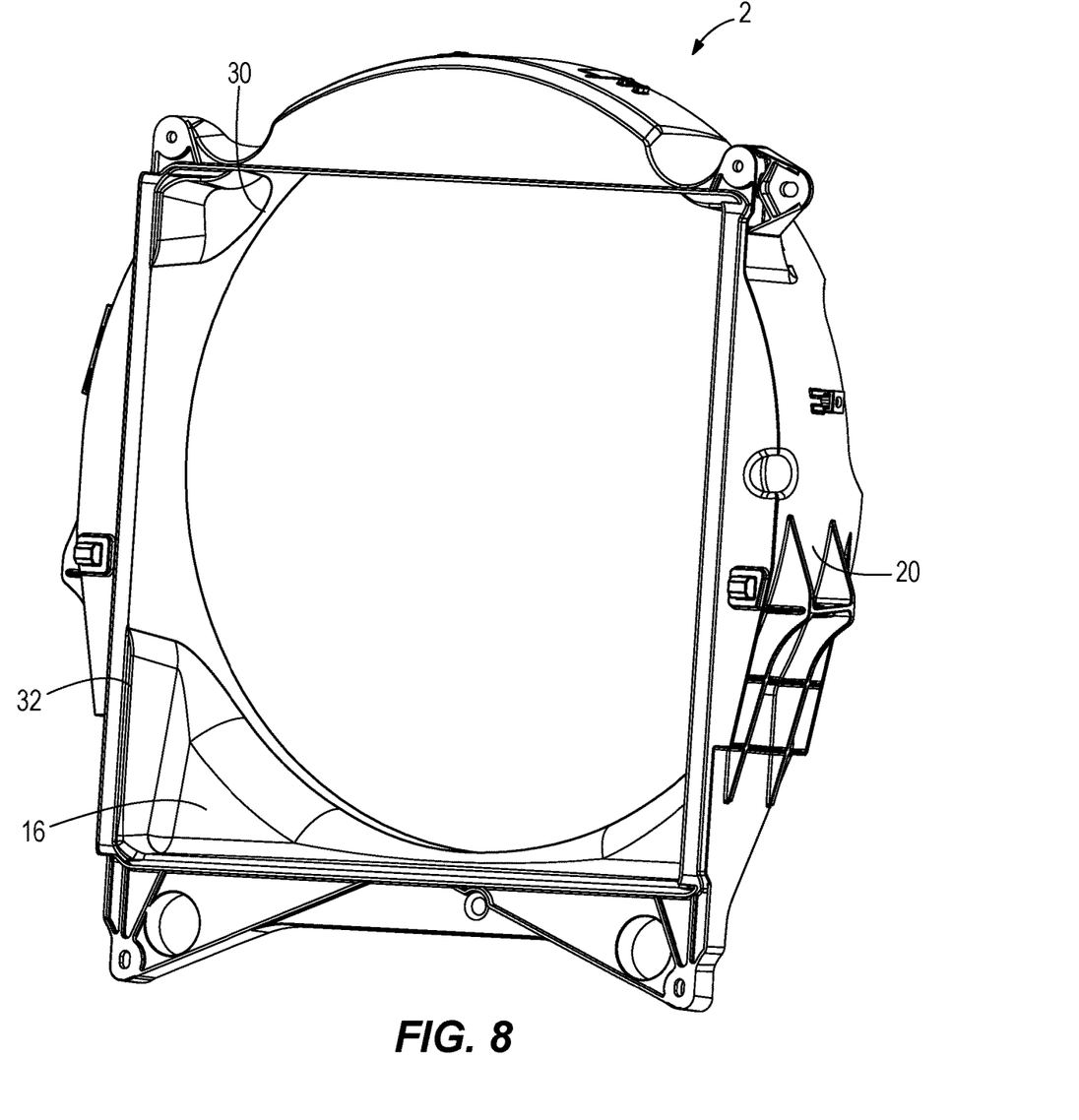
FIG. 8 is a rear perspective view of a fan shroud of the current embodiment.

As shown in FIGS. 1-3, the heat exchange module 1 of the preferred embodiment is attached to a vehicle frame 8 (partially shown). A first heat exchanger 4 and a second heat exchanger 6 are both mounted to a fan shroud 2 via fasteners and upper holes 24 in the fan shroud 2. As illustrated, the first heat exchanger 4 is a radiator core, and the second heat exchanger 6 is a charge air cooler, although the embodiments of the first heat exchanger 4 and second heat exchanger 6 are not limited to these devices.

The fan shroud 2 provides structural support to the first heat exchanger 4 and second heat exchanger 6. Through this added structural support, damaging loads applied by components of a vehicle are removed from the heat exchanger module 1. The fan shroud 2 can be formed of a reinforced polyamide material, although other materials are contemplated.

The first heat exchanger 4 is further mounted to the fan shroud 2 by fasteners and low holes 26 in the fan shroud 2. The first heat exchanger 4 is located between the second heat exchanger 6 and the fan shroud 2 in a depth direction of the heat exchanger module. As illustrated in FIG. 1, the depth direction is perpendicular to a height 48 of the fan shroud 2.

The fan shroud 2 further includes a first frame bracket 20 and a second frame bracket 22 along a periphery 17 of the fan shroud 2 that mount to the vehicle frame 8. First frame bracket 20 is attached to the vehicle frame 8 at a first, lateral side 74 of the heat exchanger module 1, and the second frame bracket 22 is attached to the vehicle frame 8 at a second, lateral side 76 of the heat exchanger module 1. Bottom walls 52 and bottom wall holes 54 of the frame brackets 20, 22 are used with fasteners to mount the fan shroud 2 to the vehicle frame 8. The bottom walls 52 are located at or below a middle plane 50 indicated by a dimensional middle plane or a plane through the center of mass of the heat exchanger module. The frame brackets 20, 22 also include back walls 56 and back wall holes 58 that connect the fan shroud 2 to the second heat exchanger 6.

The second heat exchanger 6 includes a first tank 84 with a first mounting bracket 62 and a second tank 86 with a second mounting bracket. The first mounting bracket 62 is connected to the first frame bracket 20, and the second mounting bracket is connected to the second frame bracket 22. The first frame bracket 20 and the second frame bracket 22 are connected to the vehicle frame 8, respectively at a first connection location 96 and a second connection location opposite of the first connection location. The first mounting bracket 62 and the second mounting bracket are connected to the vehicle frame 8, respectively, at a third connection location 98 and a fourth connection location opposite of the first connection location. A first distance 92 is defined between the first and the third connection locations 96, 98. A second distance is defined between the second and the fourth connection locations.

As illustrated in FIG. 3, a main module mount 102 is positioned on the periphery 17 of the fan shroud 2. The main module mount 102 has a first connection between the fan shroud 2 and the vehicle frame 8 and has a second connection between the second heat exchanger 6 and the vehicle frame 8. Since the main module mount 102 is over the center of gravity of the heat exchanger module 1, stress applied from the vehicle frame 8 to the heat exchanger module 1 is reduced compared to conventional designs.

The embodiment of the main module mount 102 in FIG. 3 illustrates a split main module mount 102 having a front isolator 104 providing the first connection and a rear isolator 106 providing the second connection. The main module mount 102 is installed on the vehicle frame 8. The front isolator 104 is installed in a pocket of the second heat exchanger 6, which is located at the third connection location 98 and a fourth connection location. Note that only the third connection 98 is visible in FIG. 3. The rear isolator 106 is installed opposite the front isolator 104 and adjacent the fan shroud 2. The rear isolator 106 is specifically located at the first connection location 96 and the second connection locations. Note that only the first connection 96 is visible in FIG. 3. The positioning of the front isolator 104 and the rear isolator 106 in relation to each other provides stability to the heat exchanger module 1 and reduces stress to the heat exchanger module 1. The need for placing stabilizer rods at a top portion and a bottom portion of the second heat exchanger 6 is eliminated by the split main module mount 102. This results in a simpler installation of the heat exchanger module 1.

The second heat exchanger 6 is mounted to a top portion 78 of the fan shroud 2 by both a first tank 84 and a second tank 86 of the second heat exchanger 6. The first heat exchanger 4 is mounted to the top portion of the fan shroud 6 by a first tank 84 of the first heat exchanger 4 and is mounted to a bottom portion 79 of the fan shroud 2 by a second tank 86 of the first heat exchanger 4. In a heat exchanger module 1 having a conventional frameless design, the module 1 is mounted to a vehicle via a direct connection to the first tank 84 and the second tank 86 of the second heat exchanger 6. This direct connection causes the stress of the module 1 to increase. As shown herein, the main module mount 102 has been found to decrease the stress applied from the vehicle to the heat exchanger module 1.

Rigid mounting support is provided to the first tank 84 and the second tank 86 of the second heat exchanger 6 by the fan shroud 2. In conventional designs, mounting structure extends the length of the first tank 84 and the second tank 86 downward from the vehicle frame 8 to align with a bottom portion of the first heat exchanger 4. In contrast the structural fan shroud 2 provided herein provides direct mounting to the first and second tanks 84, 86. This is especially advantageous when the heat exchangers are different sizes, i.e., for when the second heat exchanger 6 is shorter than the first heat exchanger 4.

A depth 93 of the fan shroud 2 is at least greater than a depth 68 of a first heat exchanger core 66. The depth 93 of the fan shroud 2 may also be greater than the sum of depth 68 and depth 72. Depth 72 is the depth of the second heat exchanger core 70.

FIGS. 4-8 depict the fan shroud 2 of the preferred embodiment without any surrounding structure. The fan shroud 2 includes an air chamber 14 between an air inlet 12 on a first side of the fan shroud 2 and an air outlet 10 on a second side of the fan shroud 2. An air chamber wall 16 at least partially defines the air chamber 14. A fan (not shown) is positioned within the air chamber 14, and is configured to direct airflow across the first heat exchanger 4 and the second heat exchanger 6. The periphery 17 of the fan shroud 2 includes an outer support wall 18. Inner support walls 28 are attached to and support the outer support wall 18 and the air chamber wall 16. One of inner support walls 28 extends between outer support walls 18 on opposite sides of the fan shroud 8.

Cavities 90 defined by a ribbed surface 108 extends in the depth direction and are positioned along the inner support walls 28 and the outer support walls 18. The webbed configuration of the cavities 90 adds increased rigidity to the structure of the fan shroud but without excessive weight and material cost. The added rigidity provided by the cavities 90 reduces displacement of the bottom portion of the first heat exchanger 4 when subjected to vibration inputs from the vehicle. As a result of the reduced vibration inputs, stability rod supports 625 can be reduced or eliminated from the fan shroud 2.

The fan shroud 2 further includes an air outlet wall 30 and air inlet wall 32 between which is located a mid-chamber wall 34. In the preferred embodiment, an outer ring wall 36 surrounds the air outlet wall 30 and is connected to the air outlet wall 30 via first ring support walls 38. A support ring wall 40 at least partially surrounds the outer ring wall 36 and is connected to the outer ring wall 36 by second ring support walls 42. Along the support ring wall 40, at least one stability rod mount 625 can be molded into the structure of the fan shroud 2. Integrated stability rod mounts 625 allow for easier packaging of the second heat exchanger 6 and greater location flexibility of the heat exchange module 1. Other attachment features, such as a condenser, fuel cooler lines, seals, hood cable, and lift eyes, can also be incorporated into the structure of the fan shroud 2.

FIGS. 9 and 10 depict an alternative embodiment of the heat exchanger module 100 including a fan shroud 200, a first heat exchanger 400, and a second heat exchanger 600. The embodiments shown in FIGS. 9 and 10 differ from the previous embodiments in that the ribbed surface 108 and the cavities 90 are not provided in the structure of the fan shroud 200, or are not visible on the surface of the fan shroud 200.

FIG. 11 depicts yet another embodiment of the heat exchanger module 150 including a fan shroud 250, a first heat exchanger 450, and a second heat exchanger 650. The fan shroud 250 covers a periphery of the first heat exchanger 450. The second heat exchanger 650 is connected to a lateral side of the first heat exchanger 450. The fan shroud 250 extends away from a second lateral side of the first heat exchanger 450, where the second lateral side is opposite of the first lateral side on the first heat exchanger 450.

FIG. 11 illustrates another embodiment of the split main module mount 152. The split main module mount 152 includes a first connecting bracket 154 that connects a first tank 158 of the second heat exchanger 650 to the fan shroud 250. The first connecting bracket 154 is an L-shaped bracket, with one side of the "L" extending parallel to a side of the shroud 250 and a second side of the "L" extending perpendicularly away from the side of the shroud 250. A second connecting bracket is provided on the opposite side of the shroud 250, but is obscured in FIG. 11. A front isolator 162 and a rear isolator 164 are positioned on the connecting bracket 154, which are connected to the vehicle frame. The front and rear isolators 162, 164 are positioned on the side of the "L" extending perpendicularly away from the side of the shroud 250.

As disclosed in detail herein, the combination of heat exchangers and a structural shroud offers advantages to the structure of a vehicle heat exchange system. The structural shroud provides structural support to the overall heat exchanger system. This improved design over a conventional frameless heat exchanger mounting design provides rigid mount support to heat exchangers even when the heat exchangers have varying heights. For example, based on other vehicle requirements, a charge air cooler may be of a design that is shorter in length than a radiator core. Conventional designs may require extensions from the bottom of, for example, charger air cooler tanks, to mount to the radiator core. These extensions can be structurally vulnerable.

Conventional frameless or partially framed heat exchanger mounting designs are also known to be structurally vulnerable. In conventional designs these stresses are absorbed by a heat exchanger tube or header, channels (e.g., steel channels) that house the radiator, cross braces that connect a radiator corner to the vehicle frame or other mounting location, and/or the opposite corner of the radiator itself. The structural support provided by the structural shroud reduces the loads on these components, or in some embodiments, eliminates the need for these components entirely. Damaging loads typically applied by a vehicle onto the heat exchangers are reduced by the support of the structural shroud as provided herein.

In some vehicle applications, the size of the radiator core requires that the radiator core extends far below a main module mount, i.e., far below the primary connection between the heat exchanger module and the vehicle frame. This extension of the radiator core acts as a lever arm to increase the stresses subjected to the radiator core from vibration inputs that result from operation of the vehicle. In these embodiments, the improved stability and/or rigidity of the structural shroud provided herein reduces stresses and allows for stability rods to be shortened or eliminated.

In embodiments where stability arms are still required, the frameless design provided herein allows mounting points for connections to the stability rods to be incorporated or integrated directly into the shroud geometry. Integrating the mounting points into the shroud allows for easier packaging and location flexibility, as well as greater durability.

The main module mount of the structural shroud also provides advantages over conventional designs. For example, the main module mount is located at or near the center of gravity of the heat exchanger unit, which reduces stresses applied to the entire assembly resulting from operation of the vehicle. Conventional frameless designs instead require mounting the heat exchanger module via the charge air cooler tanks, which results in the heat exchanger module not being mounted at the center of mass, which in turn leads to higher stresses in the entire assembly. The main module mount provided herein instead advantageously connects the heat exchanger module to the vehicle frame at a connection between the charge air cooler and the shroud. This allows for mounting the heat exchanger module closer to its center of mass, which reduces stresses in the heat exchanger assembly.

The main module mount can be formed into a split main module mount, which improves stability and, in some embodiments, eliminates the need for stabilizer rods at the top and bottom portion of the heat exchanger module. The split main module mount is provided with two different, e.g., "front" and a "rear", isolators to improve stability of the main module mount via the added connections to the vehicle frame. The front isolator is installed into a pocket of charge air cooler casting on a front side of the center of gravity of the heat exchanger module. The rear isolator is installed on an opposite side of the center of gravity of the heat exchanger module and connects the structural shroud to the vehicle frame.

The structural shroud material is a reinforced polyamide material, although other embodiments are contemplated. Reinforced polyamide materials provide advantages over conventional talc filled polypropylene material used for conventional commercial vehicle shrouds through improved strength and structural rigidity of the shroud.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

What is claimed is:

1. A fan shroud for mounting a heat exchanger module to a vehicle frame comprising:
   an air outlet at a first side of the fan shroud;
   an air inlet at a second side of the fan shroud that is spaced-apart in a depth direction from the first side;
   an air chamber extending between the air inlet and the air outlet;
   an air chamber wall at least partially defining the air chamber;
   a support wall extending in the depth direction and spaced-apart from the air chamber wall;
   a first frame bracket extending outwardly from the support wall;
   a second frame bracket extending outwardly from the support wall; and
   a plurality of inner walls that extend between the air chamber wall and the support wall,
   wherein the fan shroud has a plane that intersects at least a portion of the air outlet,
   wherein the support wall includes a first support wall on a first lateral side of the fan shroud and a second support wall on a second lateral side of the fan shroud,
   wherein the first frame bracket is attached to the first support wall,
   wherein the second frame bracket is attached to the second support wall,
   wherein the first frame bracket and the second frame bracket each include a bottom wall located at the plane,
   wherein the first frame bracket and the second frame bracket each include a back wall extending away from the respective bottom wall, and
   wherein bottom wall of first frame bracket and the second frame bracket each include a hole.

2. The fan shroud of claim 1, wherein the plurality of inner walls connect the air chamber wall and the support wall.

3. The fan shroud of claim 2, wherein the plurality of inner walls connect at oblique angles to the air chamber wall.

4. The fan shroud of claim 2, wherein the plurality of inner walls connect at oblique angles to the support wall.

5. The fan shroud of claim 4, wherein a portion of the air chamber wall and a portion of the support wall are curved.

6. The fan shroud of claim 5, wherein the plurality of inner walls connect the portion of the air chamber wall and the portion of the support wall.

7. The fan shroud of claim 1,
   wherein at least one of the plurality of inner walls extends from the first support wall, and
   wherein at least one of the plurality of inner walls extends from the second support wall.

8. The fan shroud of claim 1, wherein one of the plurality of inner walls extends from the air chamber wall to the support wall.

9. The fan shroud of claim 1, wherein the first frame bracket and the second frame bracket are located at opposite radial positions about the fan shroud.

10. The fan shroud of claim 1, wherein the first frame bracket and the second frame bracket each include at least two through holes in the bottom wall.

11. The fan shroud of claim 1, wherein the fan shroud further comprises:
   a first mount configured to receive a fastener for a heat exchanger, the first mount being spaced-apart from the first frame bracket and from the second frame bracket; and
   a second mount configured to receive a fastener for the heat exchanger, the second mount being spaced-apart from the first frame bracket and from the second frame bracket.

12. A fan shroud for mounting a heat exchanger module to a vehicle frame comprising:
   an air outlet at a first side of the fan shroud;
   an air inlet at a second side of the fan shroud that is spaced-apart in a depth direction from the first side;
   an air chamber extending between the air inlet and the air outlet;
   an air chamber wall at least partially defining the air chamber;
   a support wall extending in the depth direction and spaced-apart from the air chamber wall;
   a first frame bracket extending outwardly from the support wall;
   a second frame bracket extending outwardly from the support wall; and
   a plurality of inner walls that extend between the air chamber wall and the support wall,
   wherein the fan shroud has a plane that intersects at least a portion of the air outlet,
   wherein the support wall includes a first support wall on a first lateral side of the fan shroud and a second support wall on a second lateral side of the fan shroud,
   wherein the first frame bracket is attached to the first support wall,
   wherein the second frame bracket is attached to the second support wall,
   wherein the first frame bracket and the second frame bracket each include a bottom wall located at the plane, and
   wherein the first frame bracket and the second frame bracket each include at least two through holes.

13. The fan shroud of claim 12, wherein at least one of the plurality of inner walls extends from the first support wall, and
   wherein at least one of the plurality of inner walls extends from the second support wall.

14. The fan shroud of claim 12, wherein one of the plurality of inner walls extends from the air chamber wall to the support wall.

15. The fan shroud of claim 12, wherein the plurality of inner walls connect the air chamber wall and the support wall,
   wherein the plurality of inner walls connect at oblique angles to the air chamber wall, and
   wherein the plurality of inner walls connect at oblique angles to the support wall.

16. A fan shroud for mounting a heat exchanger module to a vehicle frame comprising:
   an air outlet at a first side of the fan shroud;
   an air inlet at a second side of the fan shroud that is spaced-apart in a depth direction from the first side;
   an air chamber extending between the air inlet and the air outlet;
   an air chamber wall at least partially defining the air chamber;
   a support wall extending in the depth direction and spaced-apart from the air chamber wall;
   a first frame bracket extending outwardly from the support wall;

a second frame bracket extending outwardly from the support wall; and a plurality of inner walls that extend between the air chamber wall and the support wall, wherein the fan shroud has a plane that intersects at least a portion of the air outlet, wherein the support wall includes a first support wall on a first lateral side of the fan shroud and a second support wall on a second lateral side of the fan shroud, wherein the first frame bracket is attached to the first support wall, wherein the second frame bracket is attached to the second support wall, wherein the first frame bracket and the second frame bracket each include a bottom wall located at the plane, and wherein the first frame bracket and the second frame bracket each include at least two through holes in the bottom wall.

17. The fan shroud of claim 16, wherein the plurality of inner walls connect the air chamber wall and the support wall.

18. The fan shroud of claim 17, wherein the plurality of inner walls connect at oblique angles to the air chamber wall, and wherein the plurality of inner walls connect at oblique angles to the support wall.

19. The fan shroud of claim 16, wherein the fan shroud further comprises:

a first mount configured to receive a fastener for a heat exchanger, the first mount being spaced-apart from the first frame bracket and from the second frame bracket; and a second mount configured to receive a fastener for the heat exchanger, the second mount being spaced-apart from the first frame bracket and from the second frame bracket.

\* \* \* \* \*